United States Patent
Bernard et al.

[11] Patent Number: 5,478,134
[45] Date of Patent: Dec. 26, 1995

[54] DEVICES FOR FASTENING THE EDGES OF SEAT CUSHION COVERS TO SEAT FRAMES

[75] Inventors: Vincent Bernard, Anould; Alain Le Breton, Ville d'Avray; Pascal Lhuissier, Beaugency; Jean-Marc Perthuis, Beuille le Comte; Thierry Stouvenel, Senones, all of France

[73] Assignee: Bertrand Faure Automobile "BFA", Massy, France

[21] Appl. No.: 178,560

[22] Filed: Jan. 7, 1994

[30] Foreign Application Priority Data

Jan. 7, 1993 [FR] France .................................. 93 00072

[51] Int. Cl.$^6$ .................................................. A47C 27/00
[52] U.S. Cl. .................................. 297/218.1; 297/452.59
[58] Field of Search ........................... 297/218.1, 452.13, 297/452.56, 452.59, 452.58

[56] References Cited

U.S. PATENT DOCUMENTS

| | | | |
|---|---|---|---|
| 3,871,041 | 3/1975 | Plume | 297/218 X |
| 3,981,534 | 9/1976 | Wilton | 297/218 |
| 4,844,546 | 7/1989 | Hanai | 297/218 X |
| 4,867,507 | 9/1989 | Arai | 297/452.59 X |

FOREIGN PATENT DOCUMENTS

| | | |
|---|---|---|
| 0300043 | 1/1989 | European Pat. Off. . |
| 2153069 | 5/1973 | Germany . |
| 4215521 | 11/1992 | Germany . |
| 541917 | 12/1941 | United Kingdom . |
| 896090 | 5/1962 | United Kingdom . |

Primary Examiner—Laurie K. Cranmer
Attorney, Agent, or Firm—Larson & Taylor

[57] ABSTRACT

The device serves to fasten the edge (7) of the cover (6) of the cushion constituting a seat back (5) to the outer flange of a channel (4) that is open towards the rear and that is provided at the edge of a plate (3) constituting framework for said cushion, the fastening device comprising a J-section member (9) attached to the edge of said cover. Said flange is firstly extended outwardly by a lateral gutter (10, 11) that is open in the opposite direction to the channel, and secondly it has a series of holes (12) punched out therein so as to form a corresponding number of tabs (13) extending parallel to the general plane of the plate, and towards the inside of the channel. The J-section member has a J-shaped head and a hook portion (14) that extends the large flap of the J-shape at right angles and that has a bead (16) formed on one side thereof such that when fastened, the hook is located astride the series of punched-out tabs while the extension and its bead are placed in contact with the outer flange (11) of the gutter.

6 Claims, 2 Drawing Sheets

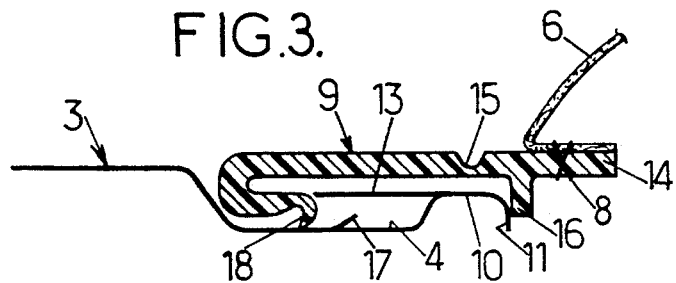
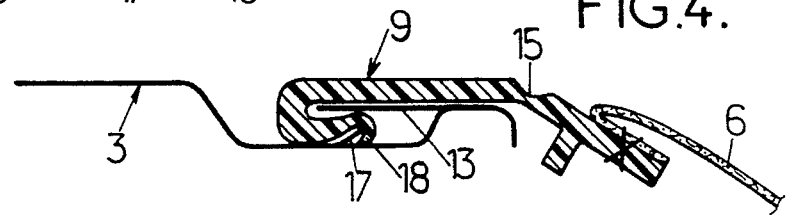
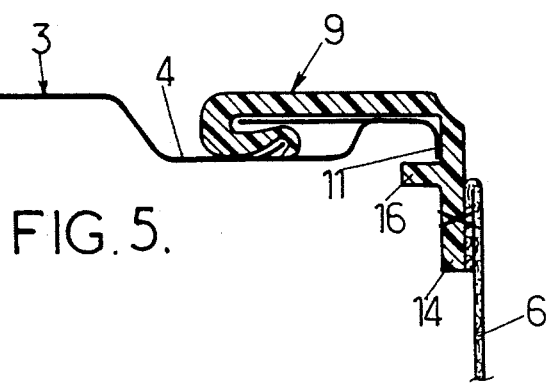
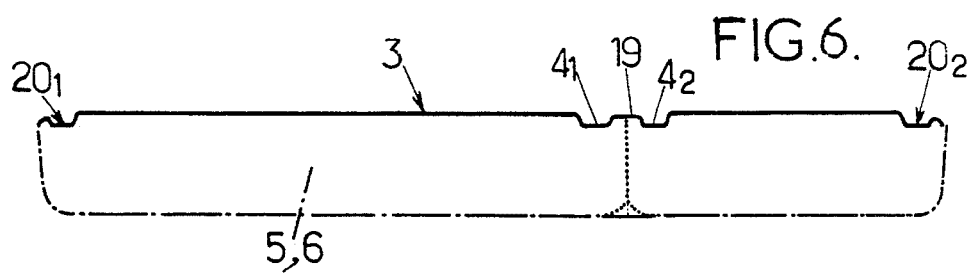
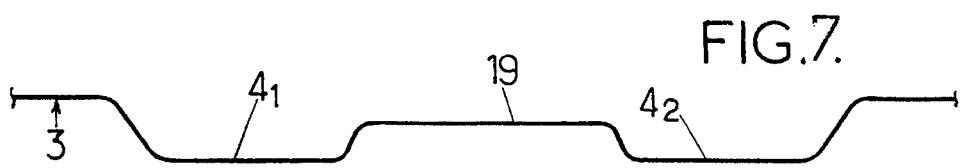
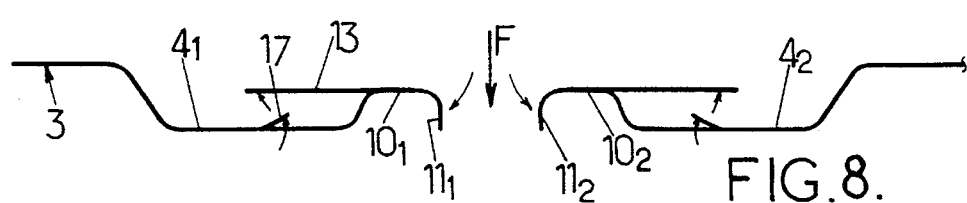

DEVICES FOR FASTENING THE EDGES OF SEAT CUSHION COVERS TO SEAT FRAMES

The invention relates to devices for fastening the edges of covers, generally made of cloth, leather, or imitation leather, and that are used for covering seat cushions, in particular in vehicles, to the rigid frames of such seats.

It relates more particularly to the case where the base of the frame is constituted by a sheet of metal or of hard plastics material and includes a rim folded so as to form a peripheral channel that is open downwards or rearwards depending on whether the cushion in question is a cushion for the seat proper or for the seat back, and where the fastening device in question comprises a J-section member attached, in particular by stitching, along the edge of the cover to be fastened, the desired fastening being obtained by causing said section member to take up a position astride the outer flange of the channel.

In known embodiments of such devices (see DE-A-3 535 353 and DE-A-3 732 836, for example), the flange of the channel onto which the J-section member is hooked extends perpendicularly to the mean plane of the plate surrounded by said channel, which gives rise to the following drawback: the channel must be relatively deep and its outer flange must be relatively tall, thereby making the fastening of the section member on said flange relatively insecure since said flange is also quite thin.

The invention enables this drawback to be remedied.

To this end, a fastening device of the kind to which the invention relates and for fastening the edge of the cover covering a cushion of a seat to the outer flange of a channel on the outside edge of a plate forming a part of the frame of said seat, which channel is open towards the outside of the cushion, the device comprising a J-section member attached, in particular by stitching, along the edge of the cover and placed astride said flange, is essentially characterized in that said flange portion having the J-section member placed astride it is constituted by a series of plane tabs punched out from the channel, and in that the bases of said tabs are extended outwardly from the channel by a continuous rim that is coplanar with the tabs.

In preferred embodiments, use is made of one or more of the following dispositions:

the inside flange of the channel is connected to a lateral strip of the plate, of which the furthest-projecting portion of the outside face lies in the same plane as the outside face of the head portion of the attached-together cover edge and section member placed astride the tabs;

spikes are punched out from the channel to cooperate for locking purposes with an outside catch provided at the free end of the hook-shaped curved portion of the J-section member;

the continuous rim is itself extended by a lip folded at right angles thereto and co-operating with said rim to form a lateral gutter that is open towards the cushion;

in a device as described in the preceding paragraph, the tabs extend parallel to the plate towards the inside of the channel and the section member is shaped so as to comprise a J-shaped head and an extension that extends the larger flat of the J-shape at right angles;

the section member as defined in the preceding paragraph, referred to below as paragraph "A", includes a narrowed zone between its hook portion and its extension, thereby forming a hinge;

in a device as defined at least in paragraph "A", the extension of the J-section member is provided on one side with a bead extending in the same direction as the curved portion of the J-shape such that, during fastening, the head of the section member is disposed astride the tab while the extension and its bead fits over and touches the lip;

when the fastening device as defined at least in paragraph A is applied to covers for seat backs having independently foldable portions and suitable for constituting a vehicle backseat, the channel-and-gutter side assembly of a given back portion disposed adjacent to another back portion is formed in the baseplate of said given back portion simultaneously with the adjacent and symmetrical channel-and-gutter lateral assembly being formed in an adjacent plate for constituting the base of the frame of said other back portion of the backseat, said two assemblies being formed by stamping and cutting out a single common main plate suitable for use as the frame base for the back of a vehicle backseat that is not subdivisible into independently foldable back portions.

In addition to the above main dispositions, the invention also includes certain other dispositions that are preferably used simultaneously therewith and that are described in greater detail below.

Various embodiments of the invention are described below with reference to the accompanying drawings, and in a manner that is naturally non-limiting.

FIG. 1 of the drawings is a fragmentary horizontal section through a vehicle seat back having a cover whose edge is fastened to the frame in accordance with the invention.

FIG. 2 is a partially cutaway perspective view showing the seat-back portion of FIG. 1.

FIGS. 3, 4, and 5 show three successive steps in the fastening of the edge of the cover to the frame.

FIG. 6 is a diagrammatic horizontal section through the back of the backseat of a vehicle and including a frame in accordance with the invention.

FIGS. 7 and 8 are on a larger scale and in horizontal section, showing a portion of said frame as used respectively for a one-piece backseat back and for a backseat back comprising two portions that can be folded down independently.

Figure 1:
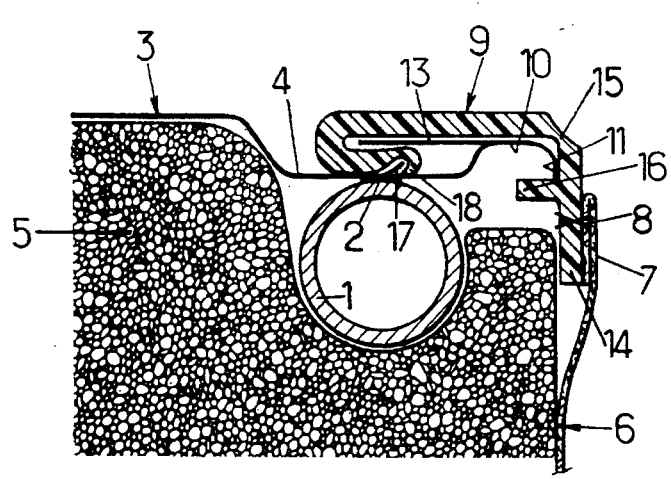
Figure 2:
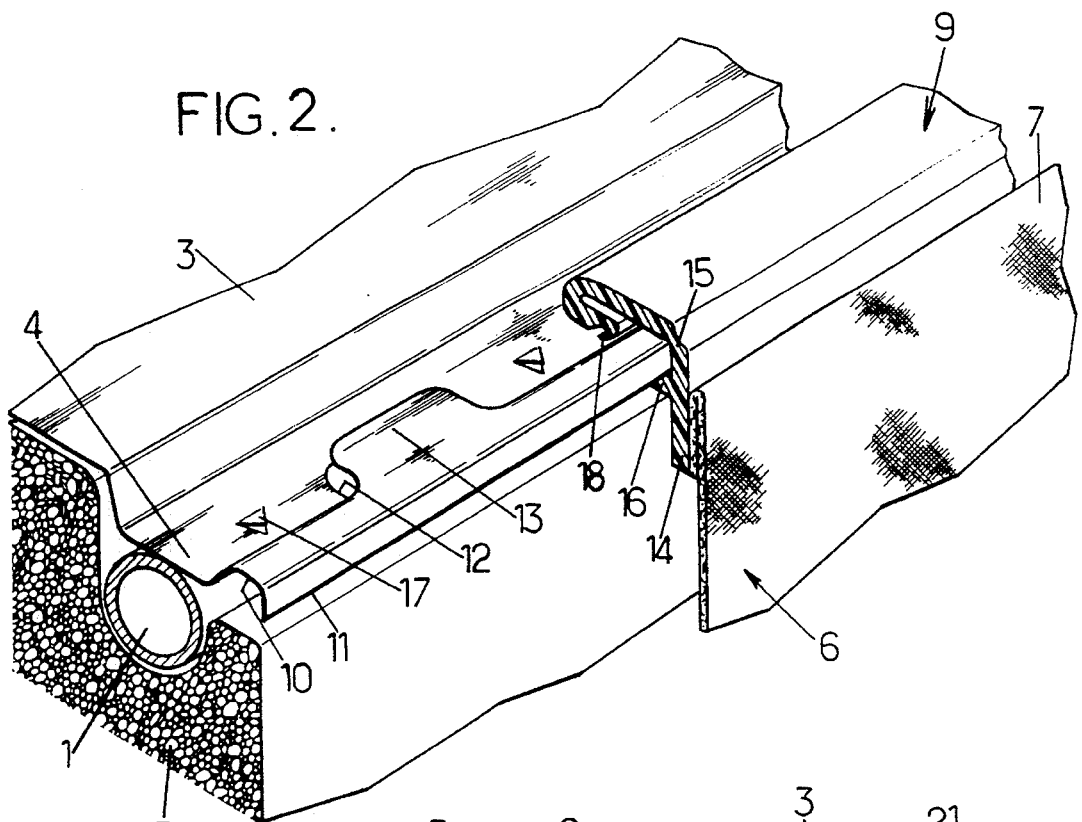

The frame of a seat back as shown in FIGS. 1 and 2 comprises:

at least one reinforcing member such as a metal tube 1; and welded to said tube at 2, a rigid rear plate 3 made of metal and having a rearwardly open channel 4 stamped in each of its two vertical edges.

The frame 1–4 supports a cushion constituted by a foam body 5 covered by a cover 6 made, in particular, of cloth, of velour, of leather, or of imitation leather.

The problem to be solved is fastening the edge 7 of the cover 6 to the edge of the plate 3.

To this end, and in conventional manner, a section member 9 of plastics material is attached to the edge 7, in particular by stitching 8. The section is J-shaped and the hooked-shaped portion of the J-shape is mounted on the outer flange of the channel 4.

However, in this case, the channel, the flange, and the section member of this fastening are designed in an original manner.

The channel 4 is relatively wide and shallow and its outer flange is outwardly extended by a rim 10 that extends parallel to the plate 3.

In this case the rim 10 is itself extended by a lip 11 folded at right angles towards the front of the seat back, thereby forming a gutter that is open in the opposite direction to the channel, i.e. in this case towards the front of the seat back.

The lip 11 lies behind the side face of the foam body 5, and substantially in the same plane.

A series of holes 12 (FIG. 2) are also formed in the outer flange of the channel 4, thereby enabling a series of tabs 13 to be punched out and directed towards the inside of the channel 4, parallel to the plane of the plate 3.

It is this series of tabs 13 that constitutes the rigid edge over which the curved hook-shaped portion of the J-section member 9 is placed astride.

It can be seen that this engagement takes place in a direction parallel to the plane of the plate 3 and no longer in a direction perpendicular to said plane, as was the case in the past.

The advantage of this concept lies in the tensions exerted on the cover are directed in said perpendicular direction: the resistance offered to said tensions is therefore greater in the present case.

As can clearly be seen in the perspective view of FIG. 2, the strength of each tab 13 in bending about its root is greater than the strength of a simple folded edge such as the "outer flange" of a prior art channel: in this case there is no weak kink or fold-line start comparable to the prior fold-lines. Each tab extends flat in its own plane into the continuous rim 10 that is integral therewith, which, in practice means that the entire rim contributes to the strength in question, i.e. to "stiffening" the tab.

To prevent the edge 7 of the cover extending over the rear face of the seat back, which could lead to the cover being damaged, the J-section member 9 is given an extension 14 that extends perpendicularly to the head or hooked end of the section and that carries the attachment line 8.

Although the extension 14 may merely be folded round the gutter 10 due to the tension in the cover, it is preferable for it to be substantially pivotally mounted on the hook-shaped portion, pivoting about a hinge 15 constituted by a narrowed connection portion between the extension and the hook.

A bead or step 16 is also provided that projects sideways from that face of the extension 14 that faces the same way as the hooked portion of the J-section member 9, with the bead being located so that when fastening is complete, it is in contact with the end edge of the lip 11 that constitutes the outside flange of the gutter 10.

This serves to lock the fastening.

The offset between the mean plane P of the plate 3 and the parallel mean plane of the tabs 13 and itself situated at the same level as the bottom of the gutter 10 is selected to be substantially equal to the thickness of the section member 9: as a result, after the cover has been fastened in place, the outside faces of the plate 3 and of the section member 9 are coplanar, thereby protecting the section member against catching accidentally.

With the device as described above, the cover is fastened as follows.

In a prior operation, the extensions 14 of J-section members 9 are attached by stitching 8 to the edges 7 of the cover 6, the section members then being in their deployed position.

During fastening proper, after the foam constituting the body 15 has been compressed, the hook-shaped portions of the J-section members 9 are placed in the uncovered portions of the channels 4 (FIG. 3).

Thereafter each hook is caused to slide parallel to the plane P in an outwards direction so as to fully engage the facing series of tabs 13 (FIG. 4).

Thereafter, each of the extensions 14 is caused to pivot through 90° about its hinge 15 so as to place the step 16 immediately in front of the end edge of the outer flange 11 of the corresponding gutter 10, and the cover 6 is put under tension (FIG. 5).

The section member as hooked in this way provides excellent resistance to said tension, in particular because the tension forces are spread over the tabs 13 and over the elements 10 and 11 instead of being applied directly and exclusively to the flange of the channel.

It should also be observed that the fastening obtained in this way is held by the step 16 even if the cover should cease to exert tension, which often happens when the cushion is working, which works leads among others to elastic compressions, and consequently to squashings and reductions of thickness of the foam body 5.

The figures also show spikes 17 punched out from the bottoms of the channels 4 for the purpose of co-operating with catches 18 outwardly formed on the edges of the hook portions of the J-section members 9, once the cover has been properly fastened.

FIGS. 6 and 8 show an application of the present invention to the back of a vehicle backseat, which application makes it possible to use a single common main plate 3 for constituting, as required, either the reinforcement for such a seat back that is of the one-piece type, or else the reinforcement of such a seat back that is subdivided into two back portions capable of being folded down independently (such backs being referred to "⅓, ⅔" if the portions are of different widths, or "½, ½", if the portions are of the same width).

In this application, the originally-stamped main plate 3 for constituting a one-piece back (5, 6) as outlined in chain-dotted lines in FIG. 6, includes two additional channels $4_1$ and $4_2$ that are united by a bridge 19 (FIGS. 6 and 7).

If a one-piece seat back is all that is required, then only cutouts for forming the tabs 13 and the spikes 17 are punched from the two end edges $20_1$ and $20_2$ of the plate.

In contrast, if two independent seat backs are required (as shown in dotted lines in FIG. 6), then the plate 3 is subjected to one or more stamping and cutting-out operations so as to split said plate into two separate plates as represented by arrow F (FIG. 8), to apply rim-forming curvature to obtain the two rims $10_1$ and $10_2$ that are extended by respective lips $11_1$ and $11_2$ along the two edges of the divide obtained in this way, and to cause the above-specified cutouts to be formed, thereby obtaining the tabs 13 and spikes 17 in the two channels $4_1$ and $4_2$.

A single main plate 3 can thus be used for making two different versions of a back for a backseat: a one-piece version and a version that is subdivided into two pieces.

As a result, regardless of the embodiment adopted, fastening devices are finally obtained for the cover having the constitution, implementation, and advantages that can be sufficiently understood from the description given above.

Naturally, and as is already clear from the above, the invention is not limited in any way to those applications and embodiments that have been described more particularly. On the contrary, the invention extends to all variants, in particular those in which the cover to be fastened is a cover for a seat proper rather than for a seat back, and also the embodiments that are outlined in FIGS. 9 and 10 as described below.

In each of these variants, it is the outer flange of the channel 14 that is directly constituted by tabs 13 punched out from the bottom of the channel and which now extend perpendicularly to the plane P of the plate 3, said tabs extending towards the rear of the seat back and being extended at their roots corresponding to the bottom of the channel by the plane continuous rim 10 which thus extends towards the front of the seat.

Figures 9, 10:
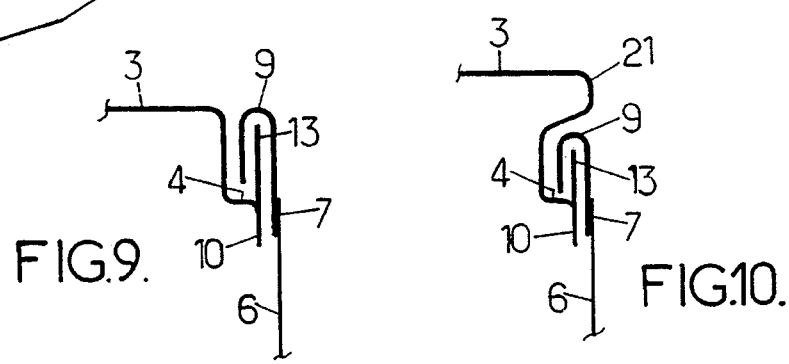
FIGS. 9 and 10 are fragmentary diagrams in horizontal section through two vehicle seat backs where the cover is fastened in accordance with two variant embodiments of the invention.

In the improved variant of FIG. 10, the inner flange of the channel 4 is additionally connected to a plane strip 21 extending the edge of the plate 3 at right angles, said strip having its outside face extending in the same plane as the outside face of the assembly constituted by the section member 9 and the edge 7 of the cover: the strip 21 serves to prevent any untimely catching between the section member 9 together with the edge 7 of the cover fixed thereto and any external obstacles (baggage, hands or feet of users, . . .).

To sum up, the fastening assembly in the variant of FIG. 10 corresponds in practice to the variant of FIG. 1 but is folded through a right angle towards the front of the seat.

In each of the two variants as described above with reference to FIGS. 9 and 10:

the section member 9 no longer has an extension folded through a right angle comparable to the extension 14 described above; and the spikes performing the same function as those referenced 17 above, i.e. designed to cooperate for locking purposes with external catches on the section member 9 analogous to the above-described catches 18, may now be punched in the inside flange of the channel 4.

We claim:

1. A device for fastening an edge of a cover covering a cushion of a seat to a series of planar tabs, each tab being punched out from a channel which faces away from the seat cushion and is located on an outside edge of a plate forming a part of a frame of said seat and extending parallel to the plate towards the inside of the channel, each tab including a base which is extended outwardly from the channel by a continuous rim that is coplanar with each tab, and wherein the continuous rim is extended by a lip folded at a right angle thereto and cooperating with the rim to form a lateral gutter that is open towards the cushion, the device comprising a J-section member having a hook-shaped curved portion which includes a large, flat portion; and an extension that extends the large, flat portion at a right angle to the hook-shaped curved portion, the extension being attached along the edge of the cover and including a bead extending parallel to the hook-shaped curved portion such that, when fastened, the hook-shaped curved portion is disposed astride the tab and the extension and its bead fits over and abuts the lip.

2. A fastening device according to claim 1, characterized in that the channel includes an inside flange connected to a lateral strip of the plate, the plate having an outside face of which the furthest-projecting portion lies in the same plane as an outside face of a head portion of the attached-together cover edge and J-section member placed astride the tabs.

3. A fastening device according to claim 1, characterized in that spikes are punched out from the channel to co-operate for locking purposes with an outside catch provided at a free end of the hook-shaped curved portion of the J-section member.

4. A fastening device according to claim 1, characterized in that the J-section member includes a narrowed zone between its hook-shaped curved portion and its extension, thereby forming a hinge.

5. A fastening device according to claim 1, applied to covers for seat backs having independently foldable portions and suitable for constituting a vehicle backseat, characterized in that a channel-and-gutter side assembly of a given back portion having a baseplate and being disposed adjacent to another back portion including a frame, is formed in the baseplate of said given back portion simultaneously with an adjacent, symmetrical channel-and-gutter lateral assembly being formed in an adjacent plate for constituting a base of the frame of said other back portion of the backseat, said two assemblies being formed by stamping and cutting out a single common main plate suitable for use as the frame base for the back of a vehicle backseat that is not subdivisible into independently foldable back portions.

6. A main plate according to claim 5, characterized in that it includes two parallel channels stamped side by side in an intermediate zone and united by means of a bridge.

* * * * *